United States Patent

Haug

(10) Patent No.: US 7,400,266 B2
(45) Date of Patent: Jul. 15, 2008

(54) METHOD FOR IMPROVING VISION IN A MOTOR VEHICLE

(75) Inventor: Karsten Haug, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 272 days.

(21) Appl. No.: 10/572,542

(22) PCT Filed: Sep. 3, 2004

(86) PCT No.: PCT/EP2004/052021

§ 371 (c)(1),
(2), (4) Date: Mar. 17, 2006

(87) PCT Pub. No.: WO2005/029125

PCT Pub. Date: Mar. 31, 2005

(65) Prior Publication Data

US 2007/0001822 A1    Jan. 4, 2007

(30) Foreign Application Priority Data

Sep. 19, 2003   (DE) ............... 10 3434 79 U

(51) Int. Cl.
*G08G 1/16* (2006.01)
(52) U.S. Cl. ............... 340/903; 340/600; 340/937; 340/619; 315/82; 315/79; 315/149; 362/507; 348/362
(58) Field of Classification Search ........... 315/77–80, 315/82, 149; 340/468, 600, 619, 621, 903, 340/904, 937; 362/487, 507; 348/216.1, 348/362
See application file for complete search history.

(56) References Cited

U.S. PATENT DOCUMENTS

| | | | |
|---|---|---|---|
| 6,882,287 B2 * | 4/2005 | Schofield | 340/903 |
| 2002/0067413 A1 | 6/2002 | McNamara | |
| 2006/0208169 A1 * | 9/2006 | Breed et al. | 250/221 |
| 2006/0291849 A1 * | 12/2006 | Shamir et al. | 396/334 |
| 2007/0069135 A1 * | 3/2007 | Kraft | 250/339.12 |
| 2007/0093951 A1 * | 4/2007 | Schroeder et al. | 701/96 |
| 2007/0211484 A1 * | 9/2007 | Marchal | 362/507 |

FOREIGN PATENT DOCUMENTS

| | | |
|---|---|---|
| DE | 40 32 927 | 4/1992 |
| DE | 101 26 492 | 12/2002 |
| EP | 0 353 200 | 1/1990 |
| EP | 1 026 031 | 8/2000 |

\* cited by examiner

*Primary Examiner*—Haissa Philogene
(74) *Attorney, Agent, or Firm*—Kenyon & Kenyon LLP

(57) ABSTRACT

A method, a device and a processing unit for improving visibility in a motor vehicle are described, a light source of the motor vehicle illuminating an illumination range. At least one monitoring sensor of the motor vehicle monitors the surroundings around the motor vehicle for the presence of objects. The light source is adjusted in such a way that the spatial and/or temporal irradiation of the objects which are present at least with light having wavelengths outside of the visible spectrum, e.g., near infrared light, is less than a specifiable limiting value.

19 Claims, 2 Drawing Sheets

METHOD FOR IMPROVING VISION IN A MOTOR VEHICLE

FIELD OF THE INVENTION

The invention relates to a method and a processing unit for improving visibility in a motor vehicle, and its use in a night-view system in a motor vehicle.

DESCRIPTION OF RELATED ART

German unexamined patent application DE 40 32 927 describes a device for improving visibility conditions in a motor vehicle. The image captured using an infrared-sensitive camera is visually superimposed onto the exterior landscape using a display device designed as a head-up display, and is displayed to the driver. Furthermore, at least one radiation source with an infrared radiation component is provided for irradiating the viewing range seen by the driver in the direction of travel.

Night-view systems (NV systems) of this type, as described, e.g., in DE 40 32 927, based on light having wavelengths in the near-infrared (NIR) wavelength range basically illuminate the scene in front of a motor vehicle using infrared headlamps (near-infrared headlamps, NIR headlamps) with high-beam characteristics. Under certain conditions, NIR radiation—which is invisible to humans and most animals—can harm the eyes of humans and animals located in the effective range of an NIR headlamp of this type. To prevent such harm, it is feasible to identify minimum distances between NIR headlamps and the eye which must be met for certain irradiation intensities, and which are ensured, e.g., using design measures.

In addition to design measures, German unexamined patent application DE 101 26 492 makes known an alternative method for ensuring harm to road users by NIR light. A method is provided, using which laser light having a wavelength outside the visible spectrum is emitted only when the motor vehicle is in motion. It is furthermore known to not activate NIR headlamps until a certain minimum velocity is reached, e.g., 30 km/h. The disadvantage of these methods is that the night-view functionality of a night-view system is not available when the motor vehicle is at a standstill and/or when traveling at a slow rate of speed, even though situations can occur in these cases in which the night-view functionality would be useful. For example, a night-view functionality would be useful when traveling slowly on dirt roads or on narrow side streets. In addition, the service life of NIR headlamps is shortened if they are frequently switched on and off. A considerable load is placed on NIR headlamps in particular in a stop-and-go situation and/or in driving situations close to the minimum velocity. This limited availability can result in lower user acceptance for a night-view system of this type.

The German unexamined patent applications DE 40 32 927 and DE 101 26 492 mentioned above contain no mention of non-harmful, highly available methods for improving visibility in a motor vehicle.

SUMMARY OF THE INVENTION

In accordance with the invention there is provided a method for improving visibility in a motor vehicle, at least one light source of the motor vehicle illuminating an illumination range, wherein at least one sensor in the motor vehicle monitors at least part of the illumination range of the light source for the presence of at least one object, the sensor generating sensor signals as a function of the at least one object which is present, the light source being adjusted as a function of the sensor signals in such a way that the spatial and/or temporal irradiation of the at least one object which is present at least with light having wavelengths outside of the visible spectrum of the light source is less than a specifiable first limiting value.

An advantage of the invention is that it achieves reduction in the harm, in particular harm to the eyes, of objects, e.g., humans, such as pedestrians and/or cyclists and/or drivers and/or animals in the illumination range of the light source caused by the non-visible radiation outside the visible spectrum.

Use of the method described below is particularly advantageous in night-view systems in motor vehicles with which a video sensor which is sensitive in the visible spectral range at least and in the near infrared spectral range in particular detects the surroundings around the motor vehicle and displays this information to the driver. In contrast to the known methods, a minimum velocity is not required to activate the headlamp nor, therefore, the night-view system. By way of the method described below, a night-view system may always be activated in an advantageous manner when the sensors (monitoring sensors) detect an unoccupied "risky" region, i.e., no objects are located in the risky region, and/or they are further away than the minimum distance required to rule out harm. The method described below makes a contribution, in a particularly advantageous manner, to a long service life of the light sources used, in particular the headlamps which illuminate at least in the near infrared wavelength range (NIR headlamps), and to high availability of the light sources and, therefore, the night-view system.

Furthermore, the method is advantageous when motor vehicles are driving in queues, since the presence of motor vehicles and/or their distance from the light sources, in particular from the NIR headlamps, is detected by the monitoring sensors, e.g., a radar sensor, and they are deactivated, for example, if the minimum distance from the light sources, in particular NIR headlamps, is not met. As a result, harm to passengers of motor vehicles driving in front who look out of the back of their vehicles, and/or harm to the driver of the motor vehicle driving in front via the rearview mirror is advantageously reduced.

A further advantage of the method described below is that the method provides a high degree of freedom in terms of designing the light source which emits light having wavelengths outside the visible spectrum, in particular an NIR headlamp. For example, the degree of freedom in terms of designing the light source with regard to emitted power and/or the spectral range used and/or illumination characteristics is high. This makes a contribution, in a particularly advantageous manner, to high performance of the light source, in particular of the NIR headlamp, and, therefore, the night-view system, at low cost. It is particularly advantageous that the method enables optimal matching of headlamps, NIR headlamps in particular, and video sensors of the night-view system to wavelength-dependent reflectances in the natural surroundings.

The method described below is advantageous in terms of the manufacture and/or maintenance and/or demonstration of a light source which emits light having wavelengths outside the visible spectrum, in particular an NIR headlamp and/or a night-view system equipped therewith, since harm to production personnel and/or workshop personnel is reduced. The method is particularly advantageous with regard to demonstration modes of the night-view system which are used to demonstrate the night-view functionality on the sales floor to potential buyers of the motor vehicle, since, e.g., harm to individuals who happen to be standing around, such as children whose eyes are at the level of the headlamps, is reduced.

It is particularly advantageous that at least one ultrasonic sensor and/or at least one radar sensor which preferably operates in the 24 GHz and/or 77 GHz wavelength range, and/or at least one LIDAR sensor and/or at least one video sensor (video camera, camera) generates sensor signals, since the use of these sensors already provided in the motor vehicle for other functionalities results in minimal additional costs, since no additional hardware is required.

The deactivation and/or activation of the light source as a function of the sensor signals is advantageous, since this makes it possible to provide a simple, economical possibility for adjusting the light source.

Adjusting the spatial and/or temporal intensity of the light from the light source as a function of the sensor signals has the advantage that harm to objects which are present is deliberately reduced by the fact that the spatial and/or temporal irradiation of the object which is present at least with light having wavelengths outside the visible spectrum of the light source is less than a specifiable first limiting value. At the same time, the functionality of a night-view system equipped in this manner does not limit the remaining detection ranges. This contributes to high availability. It is furthermore advantageous to perform an alternative or additional adjustment of the spectral composition of the light from the light source as a function of the sensor signals.

It is particularly advantageous to issue a warning to the at least one object which is present using an acoustic and/or optical warning signal if the spatial and/or temporal irradiation of the at least one object which is present at least with the light having wavelengths outside the visible spectrum of the light source is greater than a specifiable second limiting value, the second limiting value being less than or equal to the first limiting value, since, as a result, the availability of the light source, in particular the NIR headlamp, and/or the night-view system is increased, since the object which is present is warned before the light source is adjusted.

It is furthermore advantageous that sensor signals from at least two sensors are fused in such a way that the characteristic values of the at least one object which is present are ascertained as a function of weighted object features of this at least one object. By fusing the sensor signals, the method is made particularly rugged.

It is particularly advantageous that the at least one sensor generates sensor signals which represent the distance of the at least one object which is present from the at least one sensor and/or the at least one light source and/or the size and/or the shape of the at least one object.

The advantages of the method described above also apply for a device and/or a processing unit for improving visibility in a motor vehicle, and for the use of the device and/or the processing unit in a night-view system in a motor vehicle.

BRIEF DESCRIPTION OF THE DRAWINGS

The invention will be described in greater detail with reference to the following drawings wherein.

DETAILED DESCRIPTION OF THE INVENTION

Figure 1:
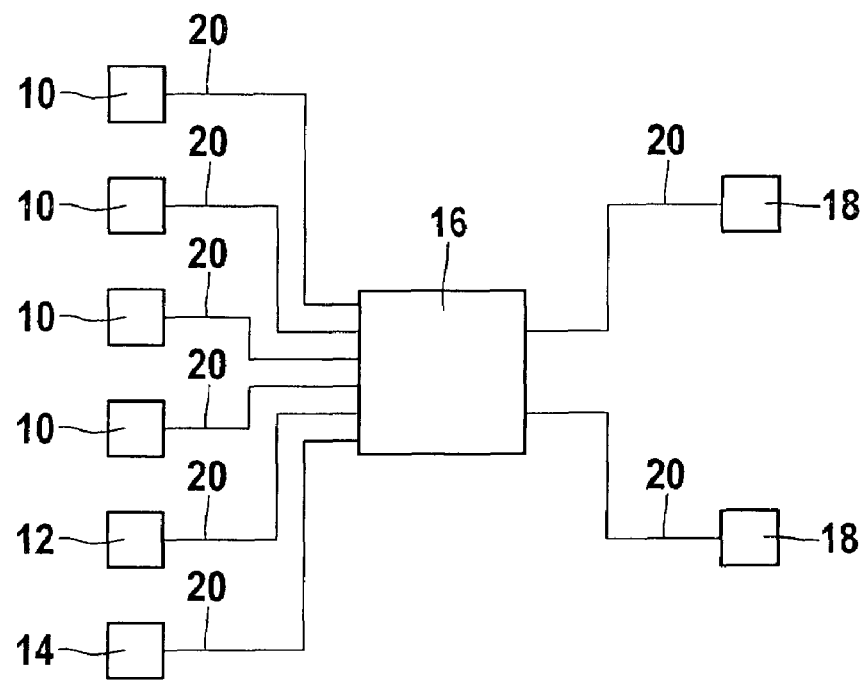
FIG. 1 shows a block diagram of the preferred exemplary embodiment.

A method, a device and a processing unit for improving visibility in a motor vehicle are described below, a light source of the motor vehicle illuminating an illumination range. At least one monitoring sensor of the motor vehicle monitors the surroundings around the motor vehicle for the presence of objects. The light source is adjusted in such a way that the spatial and/or temporal irradiation of the detected objects which are present at least with light having wavelengths outside of the visible spectrum, e.g. near infrared light, is less than a specifiable limiting value.

In the preferred exemplary embodiment, the space in front of two NIR headlamps of a night-view system are monitored using sensors. As a result, individuals and other objects located in front of the NIR headlamps, and/or their distance from the NIR headlamps is detected and, if the minimum distance is not met, the NIR headlamps are deactivated. As an alternative to deactivating the two NIR headlamps, only one headlamp may be deactivated, so that the night-view functionality of the night-view system remains available, at least to a limited extent.

As an alternative to deactivating at least one NIR headlamp, in a variation of the preferred exemplary embodiment, the output of the two NIR headlamps or at least one NIR headlamp is reduced, so that, when the distance is detected, no further harm is caused to the object. As an alternative to or in addition to the reduction in output, in a further variation, certain wavelength ranges are deactivated, e.g., by switching on certain optical blocking filters. Further, as an alternative or in addition, the radiation characteristics are changed, e.g., via mechanical shielding and/or optical elements. In a further variation of the preferred exemplary embodiment, the light source is adjusted as a function of the critical exposure time. The critical exposure time is the time at which, from this point forward, harm to the human eye is likely. This makes it possible to adjust the light sources as a function of the exposure time shortly before the critical exposure time is reached, rather than having to make the adjustment immediately.

Sensors are used in the preferred exemplary embodiment which are already present in the motor vehicle, or whose use in motor vehicles is already known. They include, for example, park pilot sensors (PP sensors) based on the use of ultrasound (ultrasonic sensors), long-range radar sensors having ranges of 77 GHz and more, as used in ACC (Adaptive Cruise Control), short-range radar sensors having a range of 24 GHz and less, or LIDAR sensors. As an alternative or in addition, a video sensor is used, in particular the video sensor for the night-view system which is already installed. In one variation of the preferred exemplary embodiment, sensor principles are used to monitor the illumination range of the light sources, in particular of the NIR headlamps, which are known from safety technology and are used, e.g., to ensure safety in dangerous regions of machinery. These include, e.g., laser scanners and/or photoelectric barriers and/or light section sensors.

In the preferred exemplary embodiment, the sensors are combined using sensor fusion in such a way that the entire relevant space in front of the vehicle is monitored. The park pilot sensors monitor the close range, up to approximately 3 meters in front of the motor vehicle, while the radar sensor monitors the long range of approximately 2 meters and further, and/or the video sensor monitors the region approximately 2 meters and further in front of the windshield.

FIG. 1 shows a block diagram of the preferred exemplary embodiment, composed of sensors 10, 12, 14, a processing unit 16 and NIR headlamps 18. Sensors 10, 12, 14 are located on a motor vehicle, as described below with reference to FIG. 2. In the preferred exemplary embodiment, four ultrasonic sensors 10, one radar sensor 12 and one video sensor 14 are used as sensors 10, 12, 14. Sensors 10, 12, 14 monitor the illumination range of NIR headlamps 18 in such a way that the monitoring ranges which are not covered in their entirety individually by the illumination range of NIR headlamps 18 supplement each other in an overlapping manner so that they monitor the entire illumination range of NIR headlamps 18. In the preferred exemplary embodiment, video sensor 14 and NIR headlamps 18 are components of a night-view system which is supplemented by a display device for depicting information from video sensor 14, the information being displayed to the driver. In the preferred exemplary embodiment, a CMOS video camera is used. In a variation of the preferred exemplary embodiment, a CCD video camera is used as an alternative or in addition. The spectral range which is particularly relevant for the night-view functionality is the spectral range located above the visible spectrum (380 nm-780 nm) and within the sensitivity range of CCD or CMOS video cameras (approximately 350 nm-1100 nm, based on the spectral sensitivity of silicon), i.e., between 780 nm and 1100 nm. NIR IR-A is therefore particularly relevant for the night-view functionality due to the sensitivity range of the video camera. Headlamps are used as NIR headlamps 18 in the preferred exemplary embodiment which have halogen incandescent lamps having a color temperature between 3200 and 3400° K., the spectral range of which is limited by interference or absorption filters to the near infrared range between approximately 780 nm and approximately 1200 nm. In one variation of the preferred exemplary embodiment, laser headlamps are used as NIR headlamps 18. Laser headlamps have the advantage, in contrast to halogen incandescent lamps, that they are pulsed, preferably with high frequency. This enables the laser headlamp to be synchronized with the illumination phase of the video camera. In a further variation, an array of light-emitting diodes (LEDs) is used as NIR headlamps 18. In principle, any light source may be used, the spectral range of which includes at least the NIR IR-A range or parts thereof. The range which is utilized is fixed, e.g., by using suitable optical filters. In addition, in a further variation of the preferred exemplary embodiment, the spectral range of NIR headlamp 18 is shifted in the NIR IR-A range using non-linear methods of wavelength shifting, e.g., frequency doubling. Depending on whether one or more objects are present, the sensors generate sensor signals which are transmitted via signal lines 20 to processing unit 16. Processing unit 16 is composed of a plurality of function modules 40, 42, 44, 46 shown in FIG. 3. Function modules 40, 42, 44, 46 are implemented as programs and/or program steps of at least one microprocessor in processing unit 16 and/or using programmable logic, in particular as ASIC and/or FPGA. Processing unit 16 generates adjustment signals for NIR headlamps 18 which are transmitted via signal lines 20, the spatial and/or temporal irradiation of the at least one object which is present and which has been detected by sensors 10, 12, 14 at least with the light having wavelengths outside the visible spectrum of NIR headlamps 18 is less than a specifiable first limiting value. The visible spectrum is specified as the wavelength range of electromagnetic radiation which is perceived by the human eye. According to DIN 5030 Part 2, a distinction is made between the following spectral ranges:

Near UV (UV-A): 315 nm-380 nm

Visible light (VIS): 380 nm-780 nm

Near infrared (NIR IR-A); 780 nm-1400 nm

Near infrared (NIR IR-B): 1400 nm-3000 nm

Accordingly, the visible spectrum (VIS) is located in the wavelength range between 380 nm and 780 nm. Infrared radiation having wavelengths greater than 780 nm, in particular NIR IR-A in the wavelength range between 780 nm to 1400 nm and NIR IR-B in the wavelength range 1400 nm to 3000 nm, and ultraviolet radiation (UV radiation) having wavelengths less than 380 nm, in particular UV-A in the wavelength range between 315 nm to 380 nm is therefore light having wavelengths outside the visible spectrum. The data is transmitted electrically and/or optically and/or by radio via signal lines 20, signal lines 20 being a 1-wire line and/or a 2-wire line and/or a multiple-wire line. In particular, signal lines 20 are designed, as an alternative or in addition, as a bus line, e.g., the CAN bus.

Figure 2:
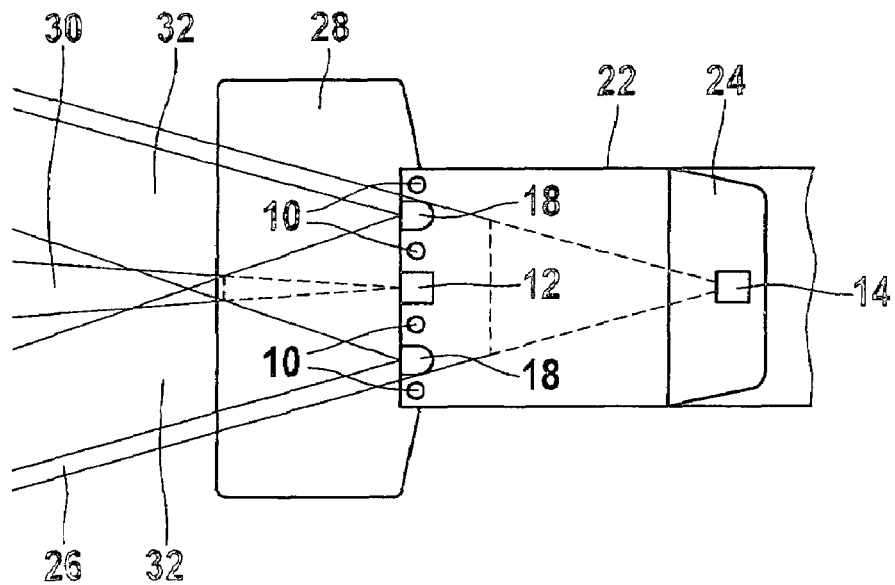
FIG. 2 shows the positions of the sensors in a motor vehicle of the preferred exemplary embodiment.

FIG. 2 shows the arrangement of sensors 10, 12, 14 and their monitoring ranges 26, 28, 30 in the area in front of motor vehicle 22 according to the preferred exemplary embodiment. FIG. 2 is a top view of motor vehicle 22, which is traveling toward the left as shown in the illustration. Two NIR headlamps 18 are installed on the front of motor vehicle 22 in the region of the headlamps for low/high beams and/or in the region of the additional headlamps and/or in the region of the fog lamps in such a way that illumination ranges 32 in the direction of travel substantially correspond to the illumination range of the high beams. Furthermore, radar sensor 12 is installed in the region of the radiator grill and/or the front bumper of motor vehicle 22. According to a variation of the preferred exemplary embodiment, a LIDAR sensor is used as an alternative or in addition to radar sensor 12. Monitoring range 30 of radar sensor 12 and/or the LIDAR sensor has an aperture of approximately 15° to 20°. Monitoring range 30 begins approximately 2 meters in front of the sensor. In a further variation, scanning radar or LIDAR principles are used as an alternative or in addition. Monitoring range 30 covered by these two sensor types is expanded by the scanning angle, which is not indicated in FIG. 2. In the preferred exemplary embodiment, video sensor 14 is installed on the inside of windshield 24 of motor vehicle 22. In addition to the monitoring functionality, video sensor 14 is also a component of the night-view system of the motor vehicle. Video sensor 14 is installed in the interior region of motor vehicle 22 in the region of the rearview mirror, the optical axis of video sensor 14 for detecting the traffic space being oriented in such a way that monitoring range 26 of video sensor 14 nearly covers illumination ranges 32 of NIR headlamps 18 in front of motor vehicle 22 in the direction of travel. Monitoring range 26 of video sensor 14 has an aperture in the direction of travel of approximately 30° and is therefore matched to the aperture of NIR headlamps 18, which is also approximately 30°. The depth of focus range and, therefore, monitoring range 26 of video sensor 14 begins approximately 2 meters in front of video sensor 14. In addition, a cluster of four ultrasonic sensors 10 is shown in FIG. 2, which are distributed symmetrically across the front bumper of motor vehicle 22. Ultrasonic sensors 10 are used as park pilot sensors to aid the driver in parking. As an alternative, in one variation, a cluster of six ultrasonic sensors 10 is used. Monitoring range 28 of ultrasonic sensors 10 covers an area of approximately 2 to 5 meters, preferably 2 meters, around the front bumper of motor vehicle 22 in the direction of travel. The cluster covers the entire area in front of NIR headlamps 18. Based on monitoring ranges 28, 30, 32 of sensors 10, 12, 14 shown, it is clear that the ranges directly in front of NIR headlamps 18 in the preferred exemplary embodiment are detected by at least two sensor types, i.e., the cluster of ultrasonic sensors 10 and video sensor 14. This contributes to high reliability of object detection.

Figure 3:
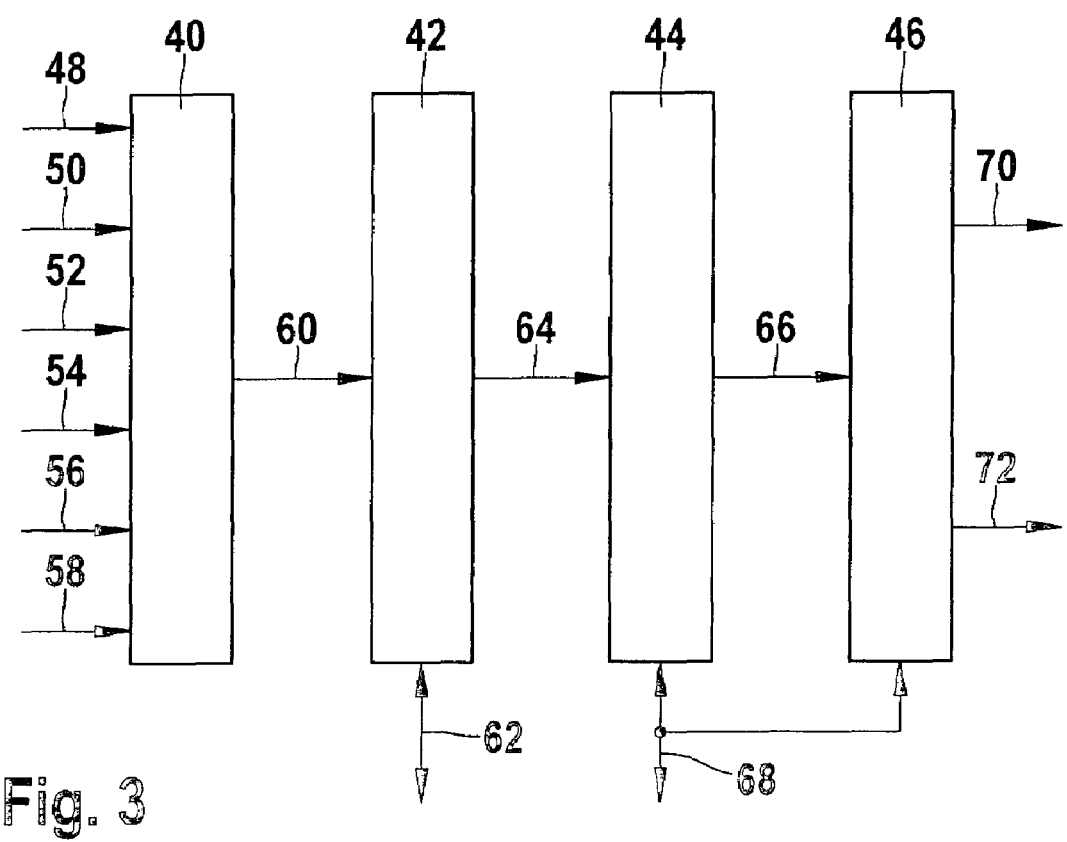
FIG. 3 shows a flow chart of the method of the preferred exemplary embodiment.

FIG. 3 shows a flow chart of the method for improving visibility in a motor vehicle of the preferred exemplary embodiment, composed of function modules 40, 42, 44, 46. FIG. 3 illustrates the signal-processing structure for the monitoring carried out by the NIR headlamps. The ultrasonic sensors, the radar sensor and the video sensors generate sensor signals in the form of object lists 48, 50, 52, 54, 56, 58, each ultrasonic sensor generating an object list 48, 50, 52, 54, the radar sensor generating object list 56, and the video sensor generating object list 58. Object lists 48, 50, 52, 54, 56, 58 contain information about the object and/or the object position and/or at least one parameter of the object which is present and has been detected by the sensor. Object lists 48, 50, 52, 54, 56, 58 are transmitted to function module 40 for object fusion. There, they are fused in such a way that the characteristic values of the least one object which is present are ascertained as a function of weighted object features of this at least one object. Object chart 60 created in function module 40 contains the fused characteristic values of the objects, e.g., the position of the objects and/or at least one characteristic value of the objects, e.g., the height and/or width and/or shape of the objects. The objects in object chart 60 are forwarded to function module 42 for object classification. Function module 42 transmits the data from object chart 60 as data for object classification 62 to the video sensor which, based on its image information, classifies the objects based on their size and shape. In this manner, it is possible to distinguish irrelevant objects, e.g., manhole covers, which are delivered by the radar sensor, from relevant objects, such as living beings. According to another variation, other surroundings sensors may be used for object classification as an alternative or in addition to the video sensor. The only precondition is that these surroundings sensors deliver other relevant data in addition to the distance away from the object, the data being usable to classify objects. Function module 42 transmits chart 66 of classified objects to function module 44 for classification of risk. Object tracking is carried out in function module 44 and/or function module 46, so that a risk identifier is calculated for each object, the risk identifier taking into account the previous distance away from the NIR headlamp(s) and/or the exposure time elapsed so far. The function module is based on a reference work 68 of harmful situations derived from eye-safety guidelines. Reference work 68 is based on legal requirements, in particular legal regulations regarding eye safety, and/or requirements voluntarily recognized by automotive manufacturers themselves. Alternatively or in addition to this, this derivation takes place as a function of the properties of the headlamps, in particular the aperture and/or the spectral range used and/or the output and/or the motor vehicle type. The derivation of the first and/or second limiting value therefore takes place on an individual basis for each vehicle and/or each country. Typical values for the minimum distance—below which the light source is adjusted—are between approximately 40 cm and approximately 15 m, depending on the design of the light source, in particular of the NIR headlamp, and/or the exposure time. All classified objects are evaluated in function module 44 with regard to their risk, based on reference work 68. As a result, a chart 66 of objects at risk is transmitted to function module 46 for use in controlling the headlamp(s). To control the headlamp(s), function module 46 first determines which of the NIR headlamps is affected based on the location of the objects at risk. In the preferred exemplary embodiment, this. NIR headlamp is then deactivated and/or switched off. In a variation of the preferred exemplary embodiment, the output and/or at least one further parameter of the NIR headlamp, e.g., the spectral composition of the light from the NIR headlamp, is controlled in such a way that, based on reference work 68 of harmful situations, one or both NIR headlamps is or are adjusted in such a way that the object is not harmed. To accomplish this, the light source is adjusted in such a way that the spatial and/or temporal irradiation of the at least one object which is present at least with light having wavelengths outside the visible spectrum of the light source is less than a specifiable first limiting value, this first limiting value being derived from reference work 68. By controlling the power, the spatial and/or temporal intensity of the light from the NIR headlamp is adjusted. In the preferred exemplary embodiment, two NIR headlamps are controlled, while only one or more than two NIR headlamps are controlled in a further variation.

The method described and/or the device and/or the processing unit for improving visibility in a motor vehicle becomes clear when NIR headlamps and/or light sources which emit light having wavelengths outside the visible spectrum are automatically switched off when objects enter the risky range and/or remain in a range for longer than the described limiting values. This is detectable directly using an NIR-sensitive sensor and/or a sensor having a sensitivity at wavelengths outside the visible spectrum and/or by monitoring the activation signals from light sources, e.g., the trigger signals and/or the supply signals and/or the CAN messages. The distance-dependent deactivation and/or warning and/or reduction is detectable directly by monitoring the behavior of the headlamps. Furthermore, the method described is detectable by monitoring the communication between the sensors, the processing unit and the control of the light sources.

The method and/or the device and/or the processing unit described are not limited to the use in a night-view system with NIR headlamps. Rather, the method and/or the device and/or the processing unit are usable not only for night-view functions, but also for other automotive functionalities which operate using light having wavelengths outside the visible spectrum, e.g., in communication between two motor vehicles which is based on infrared light. As an alternative or in addition, light sources are monitored which emit light having wavelengths in the ultraviolet (UV) spectral range.

In a further variation, the described method and or the device and/or the processing unit are used in the rear region of the motor vehicle, e.g., with an infrared-based backup camera.

With a further variation of the described method and/or the device and/or the processing unit, the monitoring for the close range of the light sources is refined in such a way that living objects, such as humans, are distinguished from devices, such as headlamp adjustment devices. The light sources are adjusted as a function of the vitality of the objects which are present. The determination of the vitality of the objects which are present is ascertained either via the size of the object and/or the shape of the object and/or the backscatter factor and/or the temporal tracking of the objects. For example, a headlamp adjustment device for both headlamps is larger than a human due to mechanical integration and composition. Furthermore, a headlamp adjustment device has a different shape than a human. Another variation provides for differentiation based on the backscatter factor, e.g., by selecting a material for the headlamp adjustment device which has a backscatter factor which differs markedly from that for a human, thereby allowing differentiation by the ultrasonic sensor, for example. As an alternative or in addition, in a further variation, a stationary headlamp adjustment device is distinguished from a moving human by tracking objects and classifying their speed.

In a further variation of the preferred exemplary embodiment, as an alternative or in addition, an acoustic and/or optical warning signal warns the at least one object which is present if the spatial and/or temporal irradiation of the at least one object which is present at least with the light having wavelengths outside the visible spectrum of the light source is greater than a specifiable second limiting value, the second limiting value being smaller than or equal to the first limiting value. In this variation, it is possible to warn humans in advance. For example, an object which is detected at close range may be warned acoustically, e.g., by a horn, or using optical signals, e.g., by flashing the headlamps and/or by a flashing warning light, with visible light. If, after a certain waiting period which is shorter than the critical exposure time, the object is still in the risky range, the light source affected—in particular the NIR headlamps of the night-view system—are deactivated. The light source, in particular the NIR headlamp, is reactivated when the object leaves the risky range and/or not until the actual value falls back below the first limiting value.

What is claimed is:

1. A method for improving visibility in a motor vehicle, the motor vehicle having at least one light source illuminating an illumination range, comprising:
monitoring at least part of the illumination range of the light source for the presence of at least one object using at least one sensor in the motor vehicle, the sensor generating sensor signals as a function of the at least one object which is present, and
adjusting the light source as a function of the sensor signals in such a way that the spatial or temporal irradiation of the at least one object which is present at least with light having wavelengths outside of the visible spectrum of the light source is less than a specifiable first limiting value.

2. The method according to claim 1, wherein the light source is a headlamp which emits illumination at least in the near-infrared wavelength range.

3. The method according to claim 2, wherein the sensor signals are generated by an ultrasonic sensor, a radar sensor, a LIDAR sensor or a video sensor.

4. The method according to claim 3, wherein the radar sensor operates in a wavelength range of 24 GHz or 77 GHz.

5. The method according to claim 2, wherein the sensor signals are generated by an ultrasonic sensor, a radar sensor, a LIDAR sensor or a video sensor.

6. The method according to claim 1, wherein the light source is deactivated or activated as a function of the sensor signals.

7. The method according to claim 2, wherein the light source is deactivated or activated as a function of the sensor signals.

8. The method according to claim 3, wherein the light source is deactivated or activated as a function of the sensor signals.

9. The method according to claim 1, wherein the spatial or temporal intensity of the light from the light source is adjusted as a function of the sensor signals.

10. The method according to claim 2, wherein the spatial or temporal intensity of the light from the light source is adjusted as a function of the sensor signals.

11. The method according to claim 3, wherein the spatial or temporal intensity of the light from the light source is adjusted as a function of the sensor signals.

12. The method according to claim 1, wherein the spectral composition of the light from the light source is adjusted as a function of the sensor signals.

13. The method according to claim 2, wherein the spectral composition of the light from the light source is adjusted as a function of the sensor signals.

14. The method according to claim 3, wherein the spectral composition of the light from the light source is adjusted as a function of the sensor signals.

15. The method according to claim 1, wherein an acoustic or optical warning signal warns the at least one object which is present if the spatial or temporal irradiation of the at least one object which is present at least with the light having wavelengths outside the visible spectrum of the light source is greater than a specifiable second limiting value, the second limiting value being less than or equal to the first limiting value.

16. The method according to claim 2, wherein an acoustic or optical warning signal warns the at least one object which is present if the spatial or temporal irradiation of the at least one object which is present at least with the light having wavelengths outside the visible spectrum of the light source is greater than a specifiable second limiting value, the second limiting value being less than or equal to the first limiting value.

17. The method according to claim 3, wherein an acoustic or optical warning signal warns the at least one object which is present if the spatial or temporal irradiation of the at least one object which is present at least with the light having wavelengths outside the visible spectrum of the light source is greater than a specifiable second limiting value, the second limiting value being less than or equal to the first limiting value.

18. A device for improving visibility in a motor vehicle, for carrying out the method according to claim 1, having at least one light source of the motor vehicle, the light source illuminating an illumination range, comprising:
at least one sensor in the motor vehicle, the sensor being configured in such a way that the sensor monitors at least part of the illumination range of the light source for the presence of at least one object, the sensor generating sensor signals as a function of the at least one object which is present, and
at least one processing unit which adjusts the light source as a function of the sensor signals in such a way that the spatial or temporal irradiation of the at least one object which is present at least with light having wavelengths outside of the visible spectrum of the light source is less than a specifiable first limiting value.

19. A processing unit for improving visibility in a motor vehicle, for carrying out the method according to claim 1, the processing unit having at least a first interface for receiving sensor signals of at least one sensor in the motor vehicle, comprising:
means for processing the sensor signals, the sensor signals containing information about the presence of at least one object within at least one part of an illumination range—of at least one light source—monitored by the sensor,
means for generating adjustment signals for the light source, the adjustment signals being produced as a function of the sensor signals in such a way that the spatial or temporal irradiation of the at least one object which is present at least with light having wavelengths outside of the visible spectrum of the light source is less than a specifiable first limiting value, and
at least one second interface for transferring the adjustment signals which were produced to the light source.

* * * * *